United States Patent [19]

Severance, Jr.

[11] Patent Number: 4,977,305

[45] Date of Patent: Dec. 11, 1990

[54] SYSTEM FOR LOW VOLTAGE PLASMA ARC CUTTING

[75] Inventor: Wayne S. Severance, Jr., Florence, S.C.

[73] Assignee: L-Tec Company, Florence, S.C.

[21] Appl. No.: 332,684

[22] Filed: Apr. 3, 1989

[51] Int. Cl.⁵ .............................................. B23K 9/00
[52] U.S. Cl. ............................ 219/121.39; 219/121.5; 219/75; 219/121.52; 219/121.51
[58] Field of Search .......... 219/137 R, 121.39, 121.36, 219/121.48, 121.5, 121.51, 121.52, 74, 75; 313/231.31, 231.41

[56] References Cited

U.S. PATENT DOCUMENTS

| | | | |
|---|---|---|---|
| 2,806,124 | 9/1957 | Gage | 219/75 |
| 2,862,099 | 11/1958 | Gage | 219/75 |
| 2,874,265 | 2/1959 | Reed et al. | 219/75 |
| 2,890,322 | 6/1959 | Oyler et al. | 219/75 |
| 2,907,863 | 10/1959 | Stanchus | 219/121.36 |
| 3,567,898 | 3/1971 | Fein | 219/75 |
| 3,969,603 | 7/1976 | Boughton et al. | 219/121.47 |
| 4,295,030 | 10/1981 | Hosoda et al. | 219/137 R |
| 4,580,032 | 4/1986 | Carkhuff | 219/75 |
| 4,598,191 | 7/1986 | Marhic et al. | 219/121.5 |
| 4,611,109 | 9/1986 | Larue et al. | 219/75 |
| 4,716,269 | 12/1987 | Carkhuff | 219/121.52 |
| 4,769,524 | 9/1988 | Hardwick | 219/121.52 |

Primary Examiner—M. H. Paschall
Attorney, Agent, or Firm—Bell, Seltzer, Park & Gibson

[57] ABSTRACT

The invention is a method and apparatus that comprises supplying a mixture of gases to a constricted plasma arc. The mixture comprises a gas that will sustain the plasma arc at the lower voltages typical of electric-arc welding and in the absence of a plasma and a gas which provides good heat transfer characteristics. The relative proportion of the gas that will sustain the plasma arc at the lower voltages present in the mixture is large enough to support the plasma arc, and the relative proportion of gas having good heat transfer charactaristics present in the mixture is small enough to prevent failure of the arc at the lower voltage. A voltage drop is maintained which is high enough to maintaing the plasma arc using the gas mixture while low enough to operate at a substantially constant current using a low voltage constant current power supply.

12 Claims, 1 Drawing Sheet

SYSTEM FOR LOW VOLTAGE PLASMA ARC CUTTING

FIELD OF THE INVENTION

The present invention relates to plasma arc cutting of metals, and in particular relates to a method for using low voltage constant current power supplies to generate plasma arcs for cutting metals.

BACKGROUND OF THE INVENTION

The field of cutting and welding metals comprises a number of techniques, of which three of the most prominent are the oxygen-acetylene, electric-arc, and plasma arc techniques. In oxygen-acetylene (or "oxy-acetylene") welding, a high temperature flame is generated by the combustion of acetylene in oxygen and then used to melt and weld metals. In electric-arc ("arc") welding, an electric potential is established between a metal workpiece and an electrode which are maintained in sufficiently close proximity for an electric arc to form between the electrode and the workpiece. The heat generated by the arc welds the metals. Typically, the arc and the metal are shielded from the surrounding atmosphere—which would otherwise tend to contaminate the weld—by the flow of an "inert" gas that is maintained adjacent the arc. In plasma arc welding, an electric arc is again formed between an electrode and a metal workpiece, and a gas flow is similarly maintained, but under such conditions of rapid gas flow and gas composition that the gases, rather than undergoing combustion reactions, become ionized and form a plasma. Plasmas typically have much higher temperatures than either combustion flames or electric arcs and therefore are useful for sophisticated welding and cutting techniques, or for welding or cutting metals which can withstand the relatively lower temperatures produced by oxy-acetylene or electric-arc techniques.

Although plasma arc cutting is particularly useful for cutting at relatively rapid rates, the voltages required to generate and sustain a plasma arc are typically very high. For example, typical plasma arc torches require and use power supplies producing between about 250 and 400 volts. By comparison, common electric-arc techniques such as tungsten inert gas (TIG) techniques typically operate at voltages of less than 100 volts, and are regulated by industry standards to about 80 volts or less. The higher voltage required for plasma arc welding and cutting makes the equipment more expensive to obtain and operate and limits its corresponding availability and use.

Alternatively, electric-arc power supplies, although more widely available, less expensive, and easier to operate, generally provide only enough power for electric-arc techniques. In comparison to plasma arc techniques, electric-arc techniques are generally slower, and are limited to welding. Prior attempts have been made to produce plasma arcs using low voltage power supplies and pure argon as the arc gas. Such devices and methods have suffered from the poor cut quality provided by argon, from the inconvenient necessity of water cooling systems, and from the additional equipment required (such as a pilot arc connection) that can be difficult to obtain.

Accordingly, there are presently no techniques or equipment which can be used to obtain the advantages of plasma arc cutting while avoiding the necessity of using high operating voltages and the associated required power supplies and other equipment.

OBJECT AND SUMMARY OF THE INVENTION

Accordingly, it is an object of the invention to provide a method and apparatus for plasma arc cutting that is particularly suitable for use with low voltage constant current power supplies and for cutting thinner portions of aluminum, stainless steel and other materials. The invention accomplishes this object by a method and apparatus that comprises supplying a mixture of gases to a constricted plasma arc. The mixture comprises a gas that will sustain the constricted plasma arc at the lower voltages typical of open arc electric-arc welding and a gas which provides good heat transfer characteristics. The relative proportion of the gas that will sustain the plasma arc at the lower voltages present in the mixture is large enough to support the plasma arc, and the relative proportion of gas having good heat transfer characteristics present in the mixture is small enough to prevent failure of the arc at the lower voltage. A voltage drop is maintained which is high enough to maintain the plasma arc using the gas mixture while low enough to operate at a substantially constant current using a low voltage constant current power supply.

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments, and wherein:

DETAILED DESCRIPTION OF THE PREFERRED EMBODIMENT

As set forth above, the invention is a method of plasma arc cutting that uses a low voltage constant current power supply. An example of such a power supply is the type used in tungsten inert gas (TIG) welding. By way of background explanation, TIG welding is an arc fusion welding process in which intense welding heat is produced by an electric-arc between a nonconsumable, torch-held tungsten electrode and a workpiece. An inert shielding gas is introduced through the torch to protect the weld zone from atmospheric contamination. Historically, TIG welding was the first practical fusion process for the precision, flux-free joining of a wide variety of metals. The power supplies used for TIG welding are characterized by their substantially constant current characteristics and are regulated by industry standard to produce 80 volts or less of open circuit potential.

An appropriate power supply for use with the present invention is the HELIARC ® 250HF power supply which is available from L-Tec Welding and Cutting Systems, Ebenezer Road, Florence, S.C. 29501. It will be understood, however, that such power supplies are well known in the welding industry and the art in general, and that other commercial models can be used in connection with the present invention without departing from the spirit or scope of the claims. It will be understood, however, that such TIG power supplies are convenient to use with the present invention, but are not necessary to it, any power supply having an open circuit voltage of about 100 volts or less being appropriate.

A plasma arc torch is used in conjunction with the power supply. As set forth earlier herein, plasma arc welding to some degree resembles TIG welding in its use of an inert gas, but differs from electric-arc welding in the use of a constricting orifice in a nozzle to obtain the rapid gas flow that helps generate and sustain the plasma. As an appropriate gas is fed through the nozzle, it is heated to as high as 50,000° F., a temperature hot enough to melt any metal. Additionally, the nozzle constricts the plasma in a manner which produces an arc that is longer, hotter and easier to handle than the arcs typically formed in TIG welding.

Figure 1:
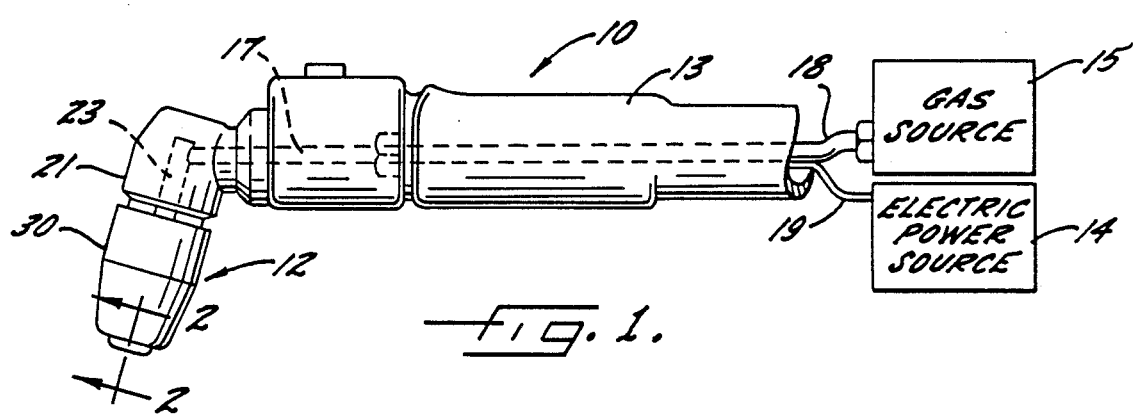
FIG. 1 is an elevational view of a plasma arc torch.

In the invention, an otherwise conventional plasma arc torch can be used, but with the appropriate modifications of the invention as set forth further herein. FIG. 1 illustrates a torch 10 which in turn comprises a torch head 12 and a handle 13. A gas source 15 is connected to the torch 10 by a gas conduit 18, and the torch is connected to an electric power source 14 by a suitable electric conduit 19. Gas flows from the conduit 18 to the torch head 12 through a tubular shank 17 and a bore 23. FIG. 1 also shows that the torch 10 includes a molded body portion 21 and a heat shield 30.

A commercial example of such a torch is the PT-31 torch that is also available from L-Tec Welding and Cutting Systems, Ebenezer Road, Florence, S.C. 29501. As in the case of the TIG type power supply, the structure and operation of a plasma arc torch are familiar to those knowledgeable in the welding arts and other comparable torches from other sources can be appropriately substituted and used in an equivalent manner. Detailed descriptions of such torches are given in U.S. Pat. No. 4,580,032 issued Apr. 1, 1986 and U.S. Pat. No. 4,716,269, issued Dec. 29, 1987, both of which are incorporated entirely herein by reference and are commonly assigned to the assignee of the present invention.

In order to support a plasma arc at lower voltage, the invention further comprises supplying a mixture of gases to the constricted plasma arc. The mixture comprises a gas that will sustain the plasma arc at the lower voltages typical of electric-arc welding along with a gas that provides good heat transfer characteristics. The relative proportions of the gases are selected so that the amount of gas that will sustain the plasma arc at lower voltages which is present in the mixture is large enough to support the plasma arc and the amount of gas having good heat transfer characteristics present in the mixture is small enough to prevent failure of the arc at the lower voltage.

In the present invention, the gas that will sustain a plasma arc at relatively low voltages is generally selected from the group consisting or argon, helium and neon. Of these, argon is most preferred from the standpoints of economy, practicality and availability.

The gas in the mixture that provides good heat transfer characteristics is generally selected from the group consisting of hydrogen, oxygen, nitrogen and air. Diatomic molecules such as hydrogen, oxygen and nitrogen provide such heat transfer characteristics partially because they dissociate at the extremely high temperatures of the plasma, but then recombine when they come into contact with the relatively cooler metal. These recombinations are exothermic in nature and thus transfer additional heat to the workpiece. In contrast, noble gases such as argon are monatomic and tend to absorb or release heat solely on the basis of their kinetic energy and therefore fail to transfer heat as efficiently as the diatomic gases. The diatomic gases, however, tend to arc at higher voltages—i.e. they will not support a plasma at lower voltages—and therefore their use tends to be limited to the high voltage plasma techniques described earlier.

In a preferred embodiment, the mixture comprises between about 10 and 20 percent air, with the remainder argon. It will be understood that various gas metering devices can affect the accuracy of the amount of gas of any type delivered to a mixture, but these tolerances do not affect the nature of the invention or the scope of the claims. In mixing gases, several competing considerations exist so that the mixture can be tailored to most benefit the user in any particular circumstance. For example, using as little argon as possible will minimize gas cost to the user. The complementary resulting higher percentages of the heat transfer gas will increase the cutting speed and quality, provide better torch cooling through better conductivity as discussed above, and will reduce arc radiation. As a tradeoff, however, reducing the argon percentage will raise the voltage needed to sustain the plasma.

With regard to the heat transfer gas, an optimum gas blend would have relatively high percentages of the heat transfer gas. At the voltages of the present invention, however, plasma arcs are best maintained when the heat transfer gas is present in an amount of about 20 percent or less. At higher percentages of a gas such as air or oxygen, starting becomes more inconsistent and unsatisfactory and becomes more of a problem as the consumable elements in a torch exhibit wear. Alternatively, if there is less than about 10 percent of the thermal transfer gas, double arcing and increased consumable wear can tend to occur.

Accordingly, in the most preferred embodiment the invention comprises a mixture of about 15 percent air in argon. The characteristics and tolerances in gas metering techniques make this an effective range of between about 12 and 19 percent air in argon. The lower percentage tends to occur at higher gas pressures and the higher percentage tends to occur at lower gas pressures.

Oxygen can be substituted for the air in the argon mixture and exhibits good results, particularly higher speeds and better cut quality. Oxygen requires higher voltages than air to sustain a plasma, however, and thus its usefulness in the present is moderated by that factor, depending on the desired application. Nitrogen has also been substituted for air with some degradation in cut quality and speed, but acceptable performance has been observed and its use is desirable in certain circumstances.

As stated above, the invention further comprises maintaining a voltage drop between the electrode and the torch that is high enough to maintain the plasma arc using the gas mixture while low enough to operate at substantially constant current using a low voltage constant current power supply. In this regard it will be understood by those familiar with arc and plasma techniques that power supplies of the type useful in the present invention exhibit certain characteristic relationships between voltage and current. Typically, at a given potentiometer setting, the voltage-current relationship for such a power supply will exhibit two types of behavior, one in which the current changes rapidly as voltage changes, and one in which the current changes very slowly with respect to the voltage change For example, in a typical power supply when the voltage is changed over a range of between 0 and 40 volts, the current will only change over a range between 320 and 340 amps. Using the same power supply, however, when the voltage is changed over a range of between 40 and 70 volts the current will change over a range between 320 and 0 amps. As a result, operating at the higher voltages causes the current to fluctuate very widely with respect to small changes in voltage. The opposite is preferred; i.e. low changes in current give the best operating conditions, especially when the current can be kept substantially constant with relatively large changes in voltage. Thus, the voltage drop is maintained low enough to operate at the substantially constant current using a low voltage constant current power supply.

As is known to those familiar with such welding equipment and power supplies, the voltage-current relationships or "curves" for particular power supplies are known and published as part of the operating characteristics of such devices, and the acceptable voltage or voltage range to use in conjunction with the invention can be easily determined for any given low voltage power supply with little or no experimentation.

With this consideration in mind, a voltage drop between the electrode and the workpiece of less than about 60 volts is most useful and a voltage drop of between about 40 and 45 volts adjacent to the workpiece is most preferred. Under such circumstances, the voltage drop at a distance of about ¼ inch off of the workpiece should be between about 50 and 55 volts. It is well understood that the voltage drop increases as the distance between the electrode and the workpiece is increased.

From the standpoint of current, in the method of the present invention, the maximum operating current should be about 55 amps, more preferably in the range of between about 38 and 52 amps, and most preferably about 45 amps.

Monitoring the current density is another method of determining the preferred operating conditions for the method of the invention. As used herein, the term current density refers to the value in amps per square inch of the operating current of the plasma arc torch divided by the cross sectional area of the orifice of the nozzle of the torch. In this regard, the method of the invention has been found to operate satisfactorily with a current density of less than about 20,000 amps per square inch, more preferably between about 7,000 and 17,000 amps per square inch and most preferably between about 9,500 and 14,000 amps per square inch.

As set forth earlier, one of the techniques used to produce a plasma is to direct the plasma-forming gases through the orifice of a constricting nozzle. The orifice size is related to the current and to the voltage drop. Higher current requires a larger orifice size for a given particular voltage drop. Orifice size also affects the selection of gases as the combination of a larger orifice and a lower gas pressure can be used to lower the voltage required to produce a plasma in a given mixture of gases. As a tradeoff, however, increasing the orifice diameter and lowering the gas pressure both tend to decreases cutting speed and quality and lowering the gas pressure also increases the wear on the nozzle and the electrode.

Figure 2:
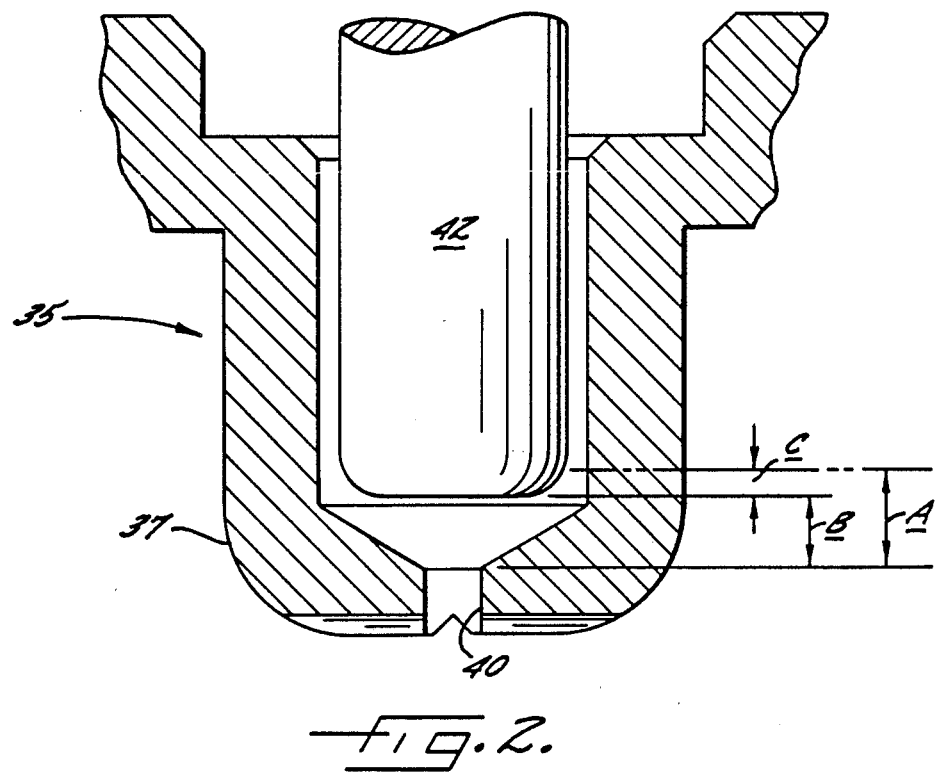
FIG. 2 is a cross sectional view of a portion of the tip of such a torch taken along lines 2—2 of FIG. 1.

FIG. 2 is a somewhat schematic illustration of a tip generally designated at 35 for a plasma arc torch that will support a plasma arc and permit plasma arc cutting at the relatively low voltages characteristic of electric-arc power supplies and using a gas mixture according to the present invention. The tip 35 comprises a nozzle 37 for directing a plasma arc generated in the welding gas mixture between a torch and a workpiece; an orifice 40 in the nozzle 37 for restricting the plasma arc that can flow through the orifice 40; and an electrode 42 in the nozzle 37 positioned rearwardly of and coaxially with the orifice 40 so that when a potential difference is applied between the electrode 42 and a workpiece, the plasma arc will travel through the orifice 40 to the workpiece.

In the invention, the orifice 40 has a diameter large enough to support a plasma arc in the welding gas mixture at the lower voltages characteristic of electric-arc power supplies while small enough to constrict a plasma arc sufficiently to produce a power density in the plasma arc that will support cutting of metals. One method of selecting the proper size orifice is to select an orifice diameter that will produce the current density levels set forth earlier herein. In a preferred embodiment of the invention, the orifice 40 has a diameter of between about 0.064 and 0.070 inches, with a diameter of 0.067 inches most preferred.

Further to producing the desired voltages levels and current densities, it will be seen from FIG. 2 that the electrode 42 is positioned rearwardly of and coaxially with the orifice 40 so that when a potential difference is applied between the electrode 42 and a workpiece, the plasma arc formed will travel through the orifice 40. In the present invention, the rearward position of the electrode 42 is selected to define a distance between the electrode 42 and the orifice 40 that is small enough to support a plasma arc in the welding gas mixture at the lower voltages characteristic of electric-arc power supplies, but large enough to permit sufficient flow of the welding gas mixture to support the plasma arc.

FIG. 2 illustrates the normal rearward position or "setback" of an electrode using a high voltage plasma. type power supply as the distance A measured from the upstream portion of the orifice 40. In the invention the smaller setback illustrated at B is incorporated, with the distance C representing the amount that the electrode 42 has been moved forwardly according to the invention. The normal setback A is on the order of about 0.063 inches with a tolerance of about 0.006 inches In the invention, the setback B is about 0.057 inches or less, and the preferred setback is about 0.049 inches, with the same tolerance, so that the distance C that the electrode 42 has been moved closer to the orifice 40 is about 0.014 inches.

Because a mixture of gases is being used to produce the plasma according to the present invention the electrode used in the torch is preferably selected from a material that is substantially stable in the plasma formed by the mixture of gases. Because the mixture of gases can include oxidizing gases such as oxygen or air, the electrode is most preferably selected from the group consisting of zirconium, hafnium or rhenium. By comparison a tungsten electrode would oxidize and be consumed within a matter of seconds in a plasma containing oxygen, whether supplied as a gas or as a component of air.

Finally, the invention comprises a packaged gas product for use in supporting plasma arc cutting at the lower voltages characteristic of electric-arc power supplies. The product comprises a package and a gas mixture carried by the package. The mixture comprises a gas that will sustain a plasma arc at the operating voltages characteristic of electric-arc power supplies and a gas which provides good heat transfer characteristics. The relative proportion of the gas that will sustain the plasma arc present in the mixture is large enough to support the plasma arc at the characteristic operating voltages and the relative proportion of gas having good heat transfer characteristics present in the mixture is small enough to prevent failure of the arc at the characteristic operating voltages of such power supplies. As stated earlier herein, the gas that will sustain a plasma arc at lower voltages is preferably selected from the group consisting of argon, helium, and neon and the gas that provides good heat transfer characteristics is preferably selected from the group consisting of hydrogen, oxygen, nitrogen and air. Preferably, the mixture comprises between about 10 and 20 percent air, with the remainder argon, and in a most preferred embodiment, the mixture comprises about 15 percent air, with the remainder argon. The package can be any suitable package for such a mixture consistent with the mixture's use in a plasma torch environment, and is generally selected from a known package such as a pressure tank.

In the specification, there have been disclosed typical preferred embodiments of the invention and although specific terms have been employed, they have been used in a generic and descriptive sense only and not for purposes of limitation, the scope of the invention being set forth in the following claims.

That which is claimed is:

1. A system for plasma arc cutting of thinner workpieces of aluminum, stainless steel and the like using lower operating voltages, and comprising:
   a power supply having an open circuit voltage of less than about 80 volts;
   a plasma arc torch for being electrically connected to said power supply and having a constricted orifice nozzle and having a gas conduit for receiving a gas supply;
   a supply of a gas mixture for being supplied to said torch through said gas conduit as a gas mixture, and wherein said gas mixture comprises a gas that will sustain a plasma arc at the operating voltages of said power supply mixed with a gas which provides good heat transfer characteristics, and wherein the relative proportion of the gas that will sustain the plasma arc present in the mixture is large enough to support the plasma arc and the relative proportion of gas having good heat transfer characteristics present in the mixture is small enough to prevent failure of the arc at the operating voltages of said power supply; and
   an electrode in said plasma arc torch that is substantially stable in a plasma formed by the mixture of gases.

2. A plasma arc cutting system according to claim 1 wherein the orifice has a diameter large enough to support a plasma arc at the voltages produced by said power supply while small enough to constrict a plasma arc sufficiently to produce a power density in the plasma arc that will support cutting of metals.

3. A plasma arc cutting system according to claim 2 wherein the orifice has a diameter that will produce a current density of between about 7000 and 17,000 amps per square inch at the voltages produced by said power supply.

4. A plasma arc cutting system according to claim 2 wherein the orifice has a diameter of between about 0.064 and 0.070 inches.

5. A plasma arc cutting system according to claim 1 wherein the mixture comprises about 15 percent air, with the remainder argon.

6. A plasma arc cutting system according to claim 1 wherein the electrode is selected from the group consisting of zirconium, hafnium, or rhenium.

7. A tip for a plasma arc torch that will support a plasma arc and permit plasma arc cutting at the relatively low voltages characteristic of electric-arc power supplies said tip comprising:
   a nozzle assembly for directing a plasma arc generated in a welding gas mixture between a torch and a workpiece wherein the welding gas mixture is formed of a gas that will sustain a plasma arc at the relatively low voltages characteristic of electric-arc power supplies mixed with a gas which provides good heat transfer characteristics;
   an orifice in said nozzle for restricting the plasma arc that can flow through said orifice, said orifice having a diameter large enough to support a plasma arc at the lower voltages characteristic of electric-arc power supplies in a welding gas mixture formed of a gas that will sustain a plasma arc at the relatively low voltages characteristic of electric-arc power supplies mixed with a gas which provides good heat transfer characteristics while small enough to constrict a plasma arc sufficiently to produce a power density in the plasma arc that will support cutting of metals; and
   an electrode in said nozzle positioned rearwardly of and coaxially with said orifice, wherein the rearward position of said electrode defines a distance between said electrode and the upstream portion of said orifice that is small enough to support a plasma arc in the welding gas mixture at the lower voltages characteristic of electric-arc power supplies but large enough to permit sufficient flow of the welding gas mixture to support the plasma arc, so that when a potential difference is applied between said electrode and a workpiece, the plasma arc will travel through said orifice, and wherein said electrode is formed of a material that is substantially stable in an oxygen-containing plasma formed by the gas mixture.

8. A tip according to claim 7 wherein the electrode is selected from the group consisting of zirconium, hafnium, or rhenium.

9. A tip according to claim 7 wherein said distance is about 0.057 inches or less.

10. A tip according to claim 7 wherein said distance is about 0.049 inches with a tolerance of about 0.006 inches.

11. A tip according to claim 7 wherein the orifice has a diameter that will produce a power density of between about 7000 and 17,000 amps per square inch at the voltages characteristic of electric-arc power supplies.

12. A tip according to claim 7 wherein the orifice has a diameter of between about 0.064 and 0.070 inches.

* * * * *